United States Patent
Karamanos

(10) Patent No.: US 7,140,236 B2
(45) Date of Patent: Nov. 28, 2006

(54) METHOD AND SYSTEM FOR CONTROLLING QUALITY AND TRACKING PARTS FOR REPAIR AND REPLACEMENT IN A PIPING SYSTEM

(76) Inventor: John Chris Karamanos, 1931 Patio Dr., San Jose, CA (US) 95125

( * ) Notice: Subject to any disclaimer, the term of this patent is extended or adjusted under 35 U.S.C. 154(b) by 11 days.

(21) Appl. No.: 10/860,573

(22) Filed: Jun. 2, 2004

(65) Prior Publication Data

US 2006/0130561 A1    Jun. 22, 2006

(51) Int. Cl.
*G01M 3/28*  (2006.01)
(52) U.S. Cl. ............................... 73/49.1; 73/46
(58) Field of Classification Search ................ 73/49.1, 73/49.5, 46
See application file for complete search history.

(56) References Cited

U.S. PATENT DOCUMENTS

| | | | |
|---|---|---|---|
| 1,429,776 A | 9/1922 | Robinson | |
| 1,793,059 A | 2/1931 | Chambers | |
| 2,233,273 A | 2/1941 | Di Vincenzo | |
| 2,534,690 A | 12/1950 | Young, Jr. et al. | |
| 2,999,605 A | 9/1961 | De Jarnett | |
| 3,706,125 A | 12/1972 | Hopkins | |
| 4,099,630 A | 7/1978 | Beck | |
| 4,123,012 A | 10/1978 | Hough | |
| 4,140,227 A | 2/1979 | Beck | |
| 4,163,372 A | 8/1979 | Frye et al. | |
| 4,193,563 A | 3/1980 | Vitale | |
| 4,261,529 A | 4/1981 | Sandberg et al. | |
| 4,541,602 A | 9/1985 | Potzas | |
| 4,550,891 A | 11/1985 | Schaty | |
| 4,779,815 A | 10/1988 | Moore et al. | |
| 4,842,227 A | 6/1989 | Harrington et al. | |
| 5,016,843 A | 5/1991 | Ward | |
| 5,458,241 A | 10/1995 | Brown | |
| 5,526,931 A | 6/1996 | White | |
| 5,771,954 A | 6/1998 | Benner et al. | |
| 5,850,037 A * | 12/1998 | Mullins | 73/40.5 R |
| 5,860,627 A | 1/1999 | Edwards | |
| 5,986,562 A * | 11/1999 | Nikolich | 340/693.5 |
| 6,135,381 A | 10/2000 | Teson | |
| 6,142,405 A | 11/2000 | Black | |
| 6,170,784 B1 | 1/2001 | MacDonald et al. | |
| D490,690 S | 6/2004 | Brass et al. | |
| 6,951,324 B1 | 10/2005 | Karamanos | |
| 2002/0080032 A1* | 6/2002 | Smith et al. | 340/572.1 |
| 2002/0088273 A1* | 7/2002 | Harness et al. | 73/118.1 |

(Continued)

FOREIGN PATENT DOCUMENTS

JP         62-8033     *  1/1987  ................. 73/49.1

(Continued)

Primary Examiner—Daniel S. Larkin
(74) Attorney, Agent, or Firm—Townsend and Townsend and Crew LLP

(57) ABSTRACT

The invention comprises a method for controlling quality in a piping system, including a valve and a piping structure coupled to the valve. The method comprises the following: pressurize the piping structure with a gas at greater than sea-level pressure; seal the gas in the piping structure with the valve; determine whether the gas stays within the piping structure; determine that gas leaks from the piping structure; and identify the location of a leak from the piping structure. The invention further comprises a method for identifying a component. The method comprises the following: indicate identification information on a tag regarding the piping structure; and attach the tag to the piping structure.

14 Claims, 5 Drawing Sheets

U.S. PATENT DOCUMENTS

2003/0050871 A1* 3/2003 Broughton ................... 705/28
2003/0222185 A1 12/2003 Rubenstein et al.

FOREIGN PATENT DOCUMENTS

JP 2-35326 * 2/1990 ................ 73/49.1

* cited by examiner

Quality Control Check List

300

| Field | Value | Ref |
|---|---|---|
| Mechanical Contractor: | ACCO | 305 |
| Job Name: | UCSF Parnassus | 310 |
| PO # : | 229057-641885 | 315 |
| VAV Tag # : | AT-326 | 320 |
| HVAC SO # : | 3947 | 325 |
| Date: | 6/26/2003 | 330 |
| HVAC-Sales Model # : | 2W-34-PS-PKG05 | 335 |
| HVAC-Sales Serial # : | AT-326 | 340 |
| Manufacture Date : | 6/26/2003 | 345 |
| Assembled By : | Norman | 350 |
| Tested By : | Norman | 355 |
| Tested Pressure : | 140 PSI | 360 |
| Final QC Check By : | Norman | 365 |

FIG. 3

METHOD AND SYSTEM FOR CONTROLLING QUALITY AND TRACKING PARTS FOR REPAIR AND REPLACEMENT IN A PIPING SYSTEM

FIELD OF THE INVENTION

The invention relates generally to quality control for heating, ventilation and air conditioning (HVAC) systems. Specifically, the invention relates to providing a pressure tested portable piping system and a method for identifying worn or damaged parts of the system.

BACKGROUND OF THE INVENTION

Completed piping systems contain a number of pipes connected together with reducing trees, adaptors, unions, elbows, etc. and connected to strainers, a variety of valves, nipples, reducing tees, screens, etc. The piping systems are typically assembled at a job site and then installed in buildings.

FIG. 1 is a diagram illustrating a prior art piping structure. Piping structure 10 includes pipe 12 connected to circuit balancing valve 14. Pipe 16 connects to pipe 18 through union 20. Reducing tee 22 includes flush bushing 24 and pressure/test port 26. Pipe 28 connects to union 30. Elbow 32 connects to pipe 34. Reducing tee 36 has outlet 38 that may connect to a hot water coil (not shown). Flush bushing 40 connects to nipple 42, which connects to ball valve 44. Piping structure 10 may be used as part of a HVAC system in a building, for example.

After the HVAC system is complete, the system is activated and tested. One problem with the prior art is that this results in many hours of problem-solving and leak-hunting. There are leaky joints, broken valves, damaged pipes, leaky coils and improperly assembled components that must be tracked down, incurring further expense on a project. Once a faulty component is found it must be identified, ordered and replaced, taking up time and delaying completion of the project. Furthermore, years after a project is complete a building manager will have to track down broken components that need identification and replacement.

What is needed is a method and system for improving quality control in HVAC systems, reducing the number of hours spent in tracking down leaks and broken components, and decreasing the amount of time required to replace an improperly functioning component.

SUMMARY OF THE INVENTION

The invention comprises a method for controlling quality in a piping system, including a valve and a piping structure coupled to the valve. The method comprises the following: pressurize the piping structure with a gas at greater than sea-level pressure; seal the gas in the piping structure with the valve; determine whether the gas stays within the piping structure; determine that gas leaks from the piping structure; and identify the location of a leak from the piping structure. The invention further comprises a method for identifying a component. The method comprises the following: indicate identification information on a tag regarding the piping structure; and attach the tag to the piping structure.

The advantages of the invention include improving the reliability of a HVAC system that implements the invention. The piping structure may be assembled off-site or on-site, and the reliability determined by an independent pressure test. If assembled off-site, the invention provides a method for determining properly assembled portable piping structures. When the piping structures arrive on-site, they can be checked to ensure the gas is at a specified pressure. If one piping structure fails to contain the gas at the specified pressure it may, prior to installation, be replaced by a piping structure that has maintained pressure. Alternatively, if a leak is found from, for example, one of the valves, the identification method of the invention provides for immediate re-order information. Rather than having to identify the part from a catalog, an identification tag provides customer-specific information about the part. Quality control is improved by using pressurized piping structures on a small scale, rather than in a completed system, and by providing information about each component in the piping structure. Furthermore, in years to follow, identification tags make identification and replacement of improperly functioning components easier than attempting to identify and order replacements for components without tags.

Finally, because the conduit is assembled and sold as a completed unit, the total price of the conduit, included the labor for assembly and tagging of the various pieces, is considered a capital investment and therefore subject to a tax beneficial depreciation. Had the work to assemble and tag the pieces been performed at a construction site, for example, it would be categorized under labor and not deductible. This is another advantage to the invention.

BRIEF DESCRIPTION OF THE DRAWING(S)

FIG. 3 is a diagram illustrating one embodiment of a tag with a list of factors.

DETAILED DESCRIPTION OF THE INVENTION

Figure 1:
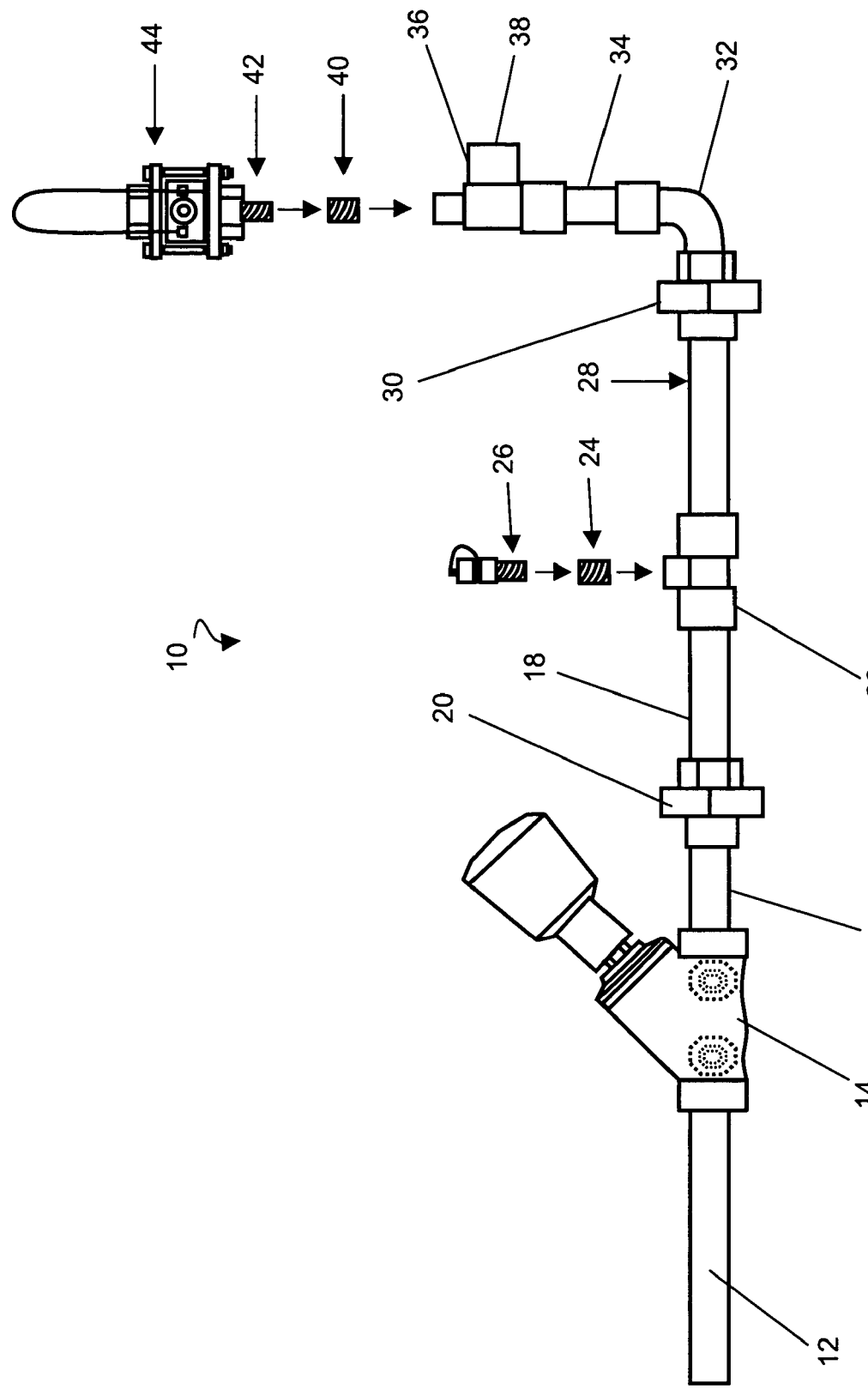
FIG. 1 is a diagram illustrating a prior art piping structure.
Figure 2:
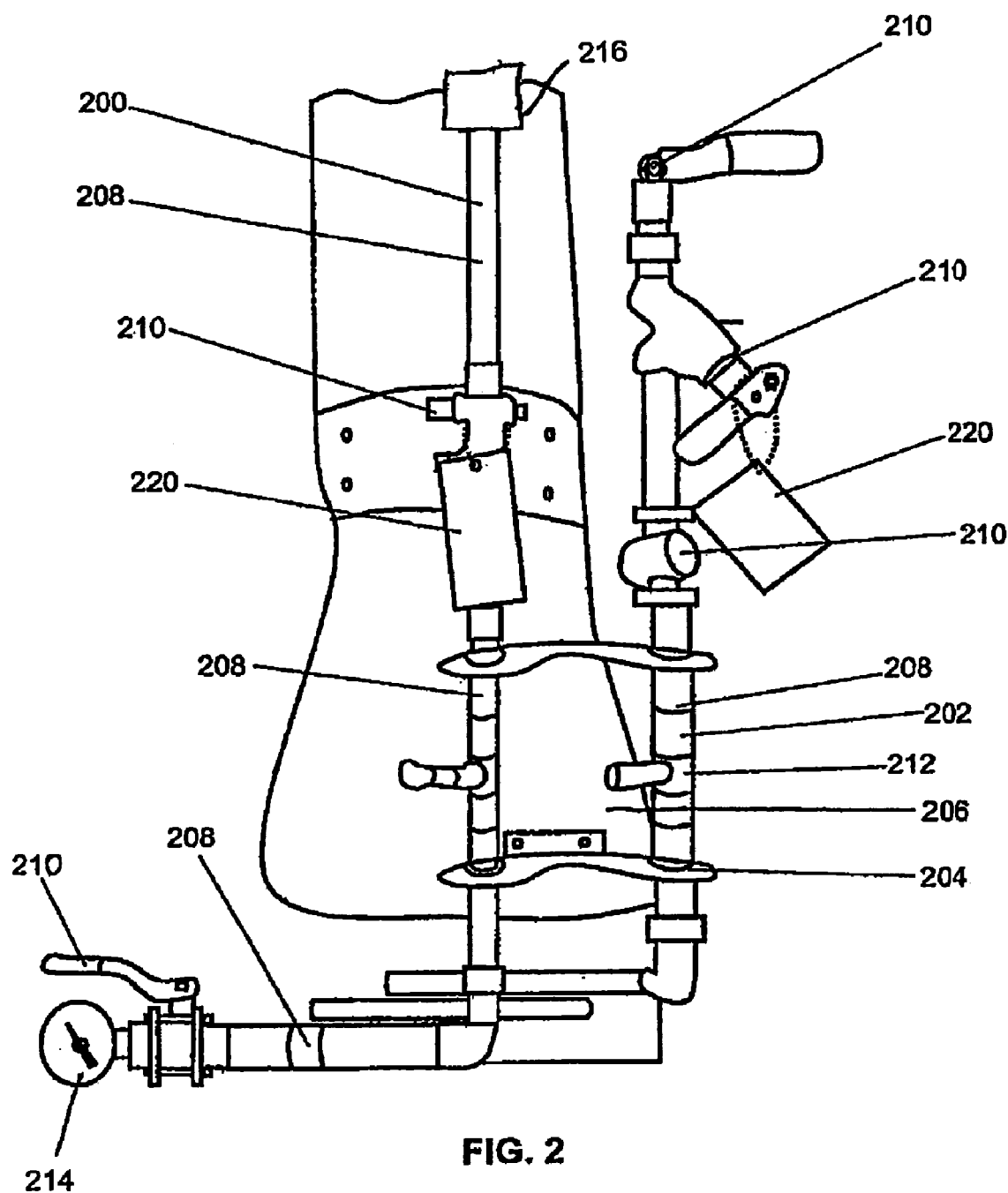
FIG. 2 is a diagram illustrating a one embodiment of the invention.

FIG. 2 is a diagram illustrating a one embodiment of the invention. Piping structures 200 and 202 are supported by hanger bracket 204 on duct 206. This embodiment illustrates an on-site installation for context alone, and not as a limitation, as the invention applies to off-site preparation of the piping structures. Pipe 208 connects to valves 210 and pressure test port 212. Although the valves in FIG. 2 are generically labeled, they may serve different purposes and have different functions. Pressure gauge 214 attaches to one end of piping structure 200. The term "valve" in this specification refers to any component in the piping structure (and related pieces) other than pipe or connections between pipes, for example adapter, elbow, etc. The parts most likely to fail are the valves. The term "piping structure" refers to one or more pipes and may include joints between pipes and other components and is not meant to be limited solely to pipes.

During off-site preparation, for example, piping structures 200 and 202 are assembled and mounted within hanging bracket 204. After construction, piping structures 200 and 202 are pressurized with, for example, a gas such as air. Other gasses or a liquid may be used, as appropriate for the piping structure, and sealed with a cap (not shown), for example. In an alternate embodiment, piping structures 200 and 202 are sealed with pressure gauge 214, indicating the pressure of the gas. A typical range of pressure used in a piping structure is 20–400 p.s.i., and in one embodiment may be 140 p.s.i.

Portable piping structures 200 and 202 are checked to ensure that they hold pressure and are delivered to a construction site. When piping structures 200 and 202 are needed for installation in the HVAC system, confirmation of their functionality can be determined by checking pressure gauge 214, if included. A piping structure that fails to hold pressure may be immediately substituted for one that maintains pressure. Identifying and replacing faulty piping structures prior to installation saves time and money. The entire piping structure may be returned to the provider, or it may be repaired on site.

Off-site assembly and testing improves quality control by providing a ready-to-install piping structure that is known to be functional, rather than having to assembly each of the individual components at the job site, in the building, and being unable to test the piping structures until the entire HVAC system is complete. The invention saves time and money that would otherwise be spent tracking down the leaks that occur during traditional installations. Additionally, a picture, for example digital or film, of the system under pressure (e.g. showing a pressurized valve) may be included to establish that the system was correctly configured and that the parts conform to customer requirements.

Eventually valves 210 in piping structures 200 and 202 will fail (or they may be initially faulty). Once the failure is located, the invention provides a method for reducing the amount of time required to replace the valve. Valves from different manufacturers and different catalogs may be used at a single construction site. Identification of the appropriate replacement valve may be difficult, time consuming, and or impossible if the valve is corroded or damaged. The identifying information provided on valves by the manufacturer may be cryptic, or difficult to locate in a completed installation. Tags 220 are attached to each valve 210 or other component that may eventually require replacement. Tags 220 may be made from, for example, metal, plastic, paper, or any other appropriate material. Tags 220 may carry barcodes or plain language, for example, and may be customized to provide information in the manner most useful for a given client. Performance requirements such as jpm, cfm, kV, and so on are accessible and in a well-defined place.

FIG. 3 is a diagram illustrating one embodiment of a tag with a list of factors. Tag 300 may include information such as general contractor name 305, job name 310, purchase order number 315, VAV number 320, sales order number 325, job site delivery or installation date 330, model number 335, serial number 340, piping structure assembly date 345, assembly technician name 350, test technician name 355, test pressure 360, and quality control technician name 365. Rather than identifying each part from a potential myriad of manufacturers, each part may be referenced to a master catalog for the piping structures maintained, for example, by the assembler of the piping structure. The master catalog contains a cross-reference for the specific manufacturer and re-order information for the faulty component and may be stored in an electronic database.

Many different manufacturers may provide components (pipes, valves, nipples, adapters, etc) for a single piping structure, and identifying the specific manufacturer is time consuming. The invention saves time by providing a tracking scheme for all the parts, to a master catalog. From the master catalog the re-order information may be obtained for each part relevant to a particular HVAC system. Tag 300 may be customized to a catalog owned by the client of a job site, or other information may be included as the client requires.

An additional benefit of tag 300 is the ability to gather statistical information regarding information on the tags. For example, data analysis may be performed to determine if failure rates are abnormally high for a certain project, or date of assembly, or assembly technician, or test technician, or to a particular general contractor, etc. One of ordinary skill in the art will recognize that other information may be included on tag 300 for other purposes, and that quality control may be improved by identifying statistically significant failure or success rates.

Figure 4:
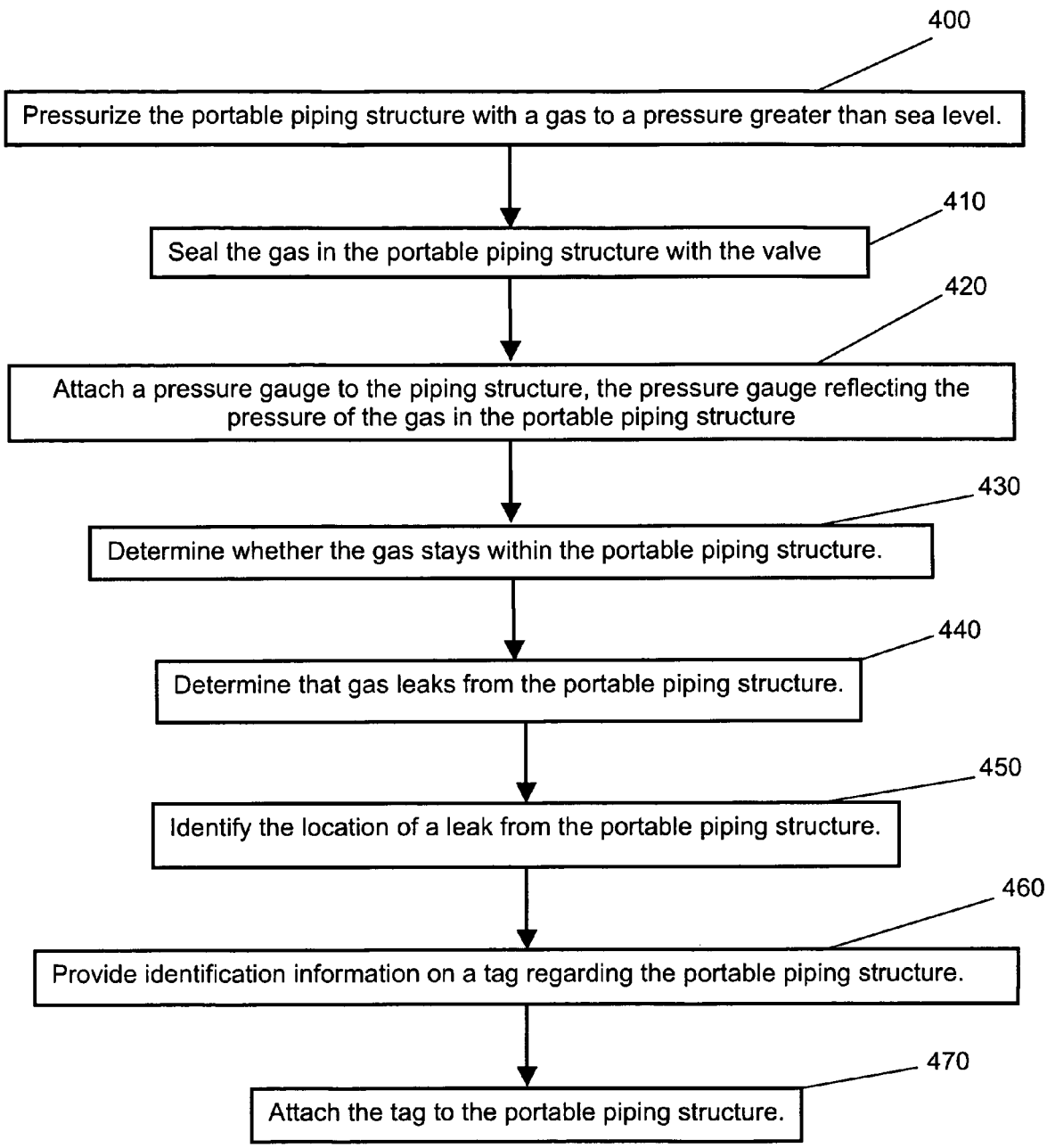
FIG. 4 is a flow diagram illustrating one method for controlling quality in a piping system.

FIG. 4 is a flow diagram illustrating one method for controlling quality in a portable piping system. The piping structure includes a valve, and a pipe coupled to the valve. In block 400, pressurize the portable piping structure with a gas to a pressure of greater than sea level. In block 410, seal the gas in the portable piping structure with the valve. In block 420, attach a pressure gauge to the portable piping structure, the pressure gauge reflecting the pressure of the gas in the portable piping structure. In block 430, determine whether the gas stays within the portable piping structure. In block 440, determine that gas leaks from the portable piping structure. In block 450, identify the location of a leak from the portable piping structure. In block 460, provide identification information on a tag regarding the portable piping structure. In block 470, attach the tag to the portable piping structure.

Figure 5:
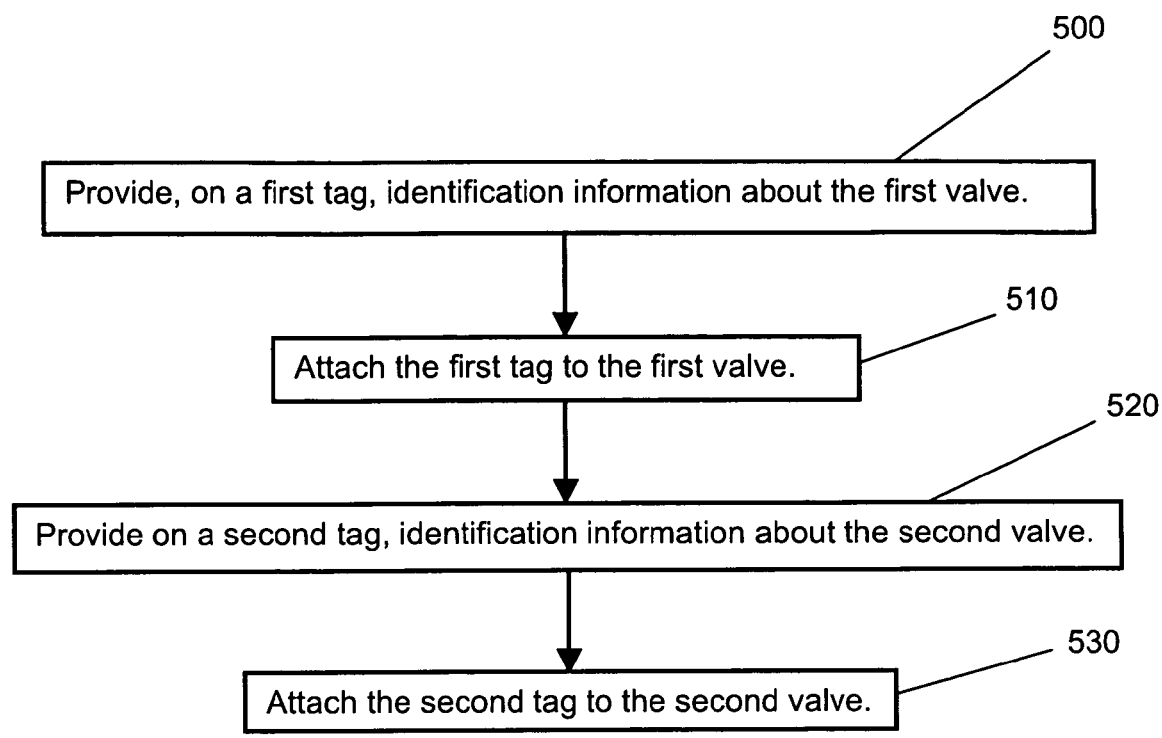
FIG. 5 is a flow diagram illustrating another method for controlling quality in a piping system.

FIG. 5 is a flow diagram illustrating one method for identifying components in a piping structure. The piping structure includes a first valve coupled to a pipe and a second valve coupled to the pipe. In block 500, provide, on a first tag, identification information about the first valve. In block 510, attach the first tag to the first valve. In block 520, provide on a second tag, identification information about the second valve. In block 530, attach the second tag to the second valve.

The advantages of the invention include a improved quality control over assembled piping structures, reduced testing and error-checking times, reduced component identification and re-order time, and improved quality control and statistical analysis. Additionally, reducing the likelihood of leaks will decrease the probability that water will seep into the system and cause mold and mildew to grow and be circulated throughout the structure. This impacts air quality and the health of building occupants and laboratory studies.

The embodiments described herein are meant to provide an enabling disclosure only and not meant as limiting features of the invention. As any person skilled in the art will recognize from the previous description and from the figures and claims that modifications and changes can be made to the invention without departing from the scope of the invention defined in the following claims.

What is claimed is:

1. A method for controlling quality in an HVAC system portable piping structure having a valve and a pipe coupled to the valve, the method comprising:

pressurizing the portable piping structure with a gas to greater than sea-level pressure;

sealing the gas in the portable piping structure with the valve;

transporting the sealed and pressurized portable piping structure from an off-site location to a construction site;

determining the pressure of the gas within the portable piping structure; and incorporating the portable piping structure into an HVAC system if the pressure of the gas within the portable piping structure meets a specified pressure.

2. The method of claim 1, further comprising:
attaching a pressure gauge to the portable piping structure, the pressure gauge reflecting the pressure of the gas in the portable piping structure.

3. The method of claim 1, further comprising:
determining that gas leaks from the piping structure; and
identifying the location of a leak from the piping structure.

4. The method of claim 1, further comprising:
indicating identification information on a tag regarding the piping structure; and
attaching the tag to the piping structure.

5. The method of claim 4, wherein the identification information includes a serial number and a model number.

6. The method of claim 4, wherein the piping structure includes a plurality of pipes coupled together.

7. A method for controlling quality in an HVAC system portable piping structure, including a pipe and a cap, the method comprising:
pressurizing the portable piping structure with a gas at greater than sea-level pressure;
sealing the gas in the portable piping structure with the cap;
transporting the sealed and pressurized portable piping structure from an off-site location to a construction site;
determining the pressure of the gas within the portable piping structure; and
incorporating the portable piping structure into an HVAC system if the pressure of the gas within the portable piping structure meets a specified pressure.

8. The method of claim 7, further comprising:
determining that gas leaks from the portable piping structure; and
identifying a leak from the portable piping structure.

9. The method of claim 8, wherein the portable piping structure includes a plurality of pipes coupled together.

10. The method of claim 9, further comprising:
providing identification information on a tag regarding the portable piping structure; and
attaching the tag to the portable piping structure.

11. A method for analyzing components in an HVAC system portable piping structure, including a first valve coupled to a pipe, the method comprising:
providing, on a first tag, identification information about the first valve;
attaching the first tag to the first valve;
pressurizing the piping structure with a gas to greater than sea-level pressure;
sealing the gas in the piping structure with the valve;
transporting the piping structure from an off-site location to a construction site;
determining a gas pressure within the piping structure; and
correlating the gas pressure with the first tag identification information to determine a failure rate associated with the first tag identification information.

12. The method of claim 11, the method further comprising:
referencing the first valve to a master catalog for the piping structure, the master catalog maintained by the assembler of the piping structure.

13. The method of claim 12, wherein the identification information includes a serial number and a model number.

14. A method of controlling quality in an HVAC system portable piping structure comprising:
pressurizing the portable piping structure with a gas to greater than sea-level pressure, the portable piping structure comprising:
a valve; and
a pipe coupled to the valve;
sealing the gas in the portable piping structure with the valve;
determining a pressure of the gas within the portable piping structure at an assembly location;
attaching a tag to the portable piping structure, the tag including identification information regarding the portable piping structure;
transporting the sealed and pressurized portable piping structure from the assembly location to a construction site;
determining a pressure of the gas within the portable piping structure at the construction site;
correlating a difference between the pressure of the gas within the portable piping structure at the assembly location and the pressure of the gas within the portable piping structure at the construction site with the identification information regarding the portable piping structure included on the tag; and
incorporating the portable piping structure into an HVAC system if the difference between the pressure of the gas within the portable piping structure at the assembly location and the pressure of the gas within the portable piping structure at the construction site meets a specified standard.

* * * * *